United States Patent
Chen et al.

(10) Patent No.: US 8,030,896 B2
(45) Date of Patent: Oct. 4, 2011

(54) MULTI-OUTPUT VOLTAGE BATTERY MODULE AND ELECTRONIC DEVICE USING THE SAME

(75) Inventors: Yi-Chien Chen, Taipei (TW); Yen-Hsun Lee, Taipei (TW)

(73) Assignee: Inventec Corporation, Taipei (TW)

( * ) Notice: Subject to any disclaimer, the term of this patent is extended or adjusted under 35 U.S.C. 154(b) by 387 days.

(21) Appl. No.: 12/369,989

(22) Filed: Feb. 12, 2009

(65) Prior Publication Data

US 2010/0052622 A1    Mar. 4, 2010

(30) Foreign Application Priority Data

Sep. 3, 2008    (TW) ................. 97133807 A

(51) Int. Cl.
*H02J 7/10* (2006.01)
(52) U.S. Cl. .................. 320/124; 320/138; 320/148
(58) Field of Classification Search .................. None
See application file for complete search history.

(56) References Cited

U.S. PATENT DOCUMENTS

| | | | |
|---|---|---|---|
| 5,519,261 A * | 5/1996 | Stewart | 307/87 |
| 5,936,383 A * | 8/1999 | Ng et al. | 320/132 |
| 2007/0269692 A1 * | 11/2007 | Chen et al. | 429/23 |
| 2009/0096421 A1 * | 4/2009 | Seman, Jr. | 320/122 |
| 2009/0134841 A1 * | 5/2009 | Gilmore et al. | 320/118 |
| 2009/0179612 A1 * | 7/2009 | Sherman et al. | 320/103 |
| 2010/0007310 A1 * | 1/2010 | Kawamoto et al. | 320/134 |

FOREIGN PATENT DOCUMENTS

CN    1549421 A    11/2004

OTHER PUBLICATIONS

Office Action issued on Mar. 3, 2011 in Chinese corresponding application No. 2008 10213168.5.

* cited by examiner

*Primary Examiner* — Vinh Nguyen
(74) *Attorney, Agent, or Firm* — Bacon & Thomas, PLLC

(57) ABSTRACT

A multi-output voltage battery module including a main body, a plurality of battery cells and a power-managing unit is provided. The battery cells are disposed within the main body and respectively provide different supply voltages for a plurality of electronic elements disposed in an electronic device. The power-managing unit is electrically connected to the battery cells for converting an external voltage into a plurality of charging voltages and further correspondingly outputting the charging voltages to charge the battery cells. The magnitude of each charging voltage is equal to that of the corresponding supply voltage.

26 Claims, 4 Drawing Sheets

US 8,030,896 B2

MULTI-OUTPUT VOLTAGE BATTERY MODULE AND ELECTRONIC DEVICE USING THE SAME

This application claims the benefit of Taiwan application Serial No. 97133807, filed Sep. 3, 2008, the subject matter of which is incorporated herein by reference.

BACKGROUND OF THE INVENTION

1. Field of the Invention

The invention relates in general to a battery module, and more particularly to a multi-output voltage battery module and an electronic device using the same.

2. Description of the Related Art

Most of the batteries used in portable electronic devices such as mobile phones, walkmans, digital cameras, laptop computers and so on, have single voltage output and standard charging/discharging time and lifespan. Take a laptop computer for example. The adaptor of the laptop computer first receives an AC voltage of 100~240V. The AC voltage is then converted by an AC/DC converter and outputted as a DC voltage of 10~32V (normally, 18.5V or 19.5V) to the battery of the laptop computer. The battery provides a single voltage to the laptop computer.

As different elements and chips of a laptop computer may require different voltages, the single voltage outputted from the battery needs to be further converted so as to provide these elements and chips with suitable voltages. However, the conversion of voltage usually causes the waste of power from the battery. Furthermore, as the laptop computer is getting thinner, the size of the battery is getting smaller, such that the durability of battery is affected. Thus, how to prolong the operating time of the battery has become an issue to be concerned.

SUMMARY OF THE INVENTION

The invention is directed to a multi-output voltage battery module and an electronic device using the same. The battery module directly provides a plurality of voltages to different electronic elements in the electronic device, so as to decrease the loss of energy in the electronic device.

According to a first aspect of the present invention, a multi-output voltage battery module disposed in an electronic device is provided. The electronic device includes a plurality of electronic elements. The multi-output voltage battery module includes a main body, a plurality of battery cells and a power-managing unit. The battery cells are disposed within the main body and respectively provide different supply voltages to different electronic elements in the electronic device. The power-managing unit is electrically connected to the battery cells for converting an external voltage into a plurality of charging voltages and further correspondingly outputting the charging voltages to charge the battery cells. The magnitude of each charging voltage is equal to that of the corresponding supply voltage.

According to a second aspect of the present invention an electronic device including a plurality of electronic elements and a multi-output voltage battery module is provided. The multi-output voltage battery module includes a main body, a plurality of battery cells and a power-managing unit. The battery cells are disposed within the main body and respectively provide different supply voltages to different electronic elements. The power-managing unit is electrically connected to the battery cells for converting an external voltage into a plurality of charging voltages and further correspondingly outputting the charging voltages to charge the battery cells. The magnitude of each charging voltage is equal to that of the corresponding supply voltage.

The invention will become apparent from the following detailed description of the preferred but non-limiting embodiments. The following description is made with reference to the accompanying drawings.

DETAILED DESCRIPTION OF THE INVENTION

First Embodiment

Figure 1:
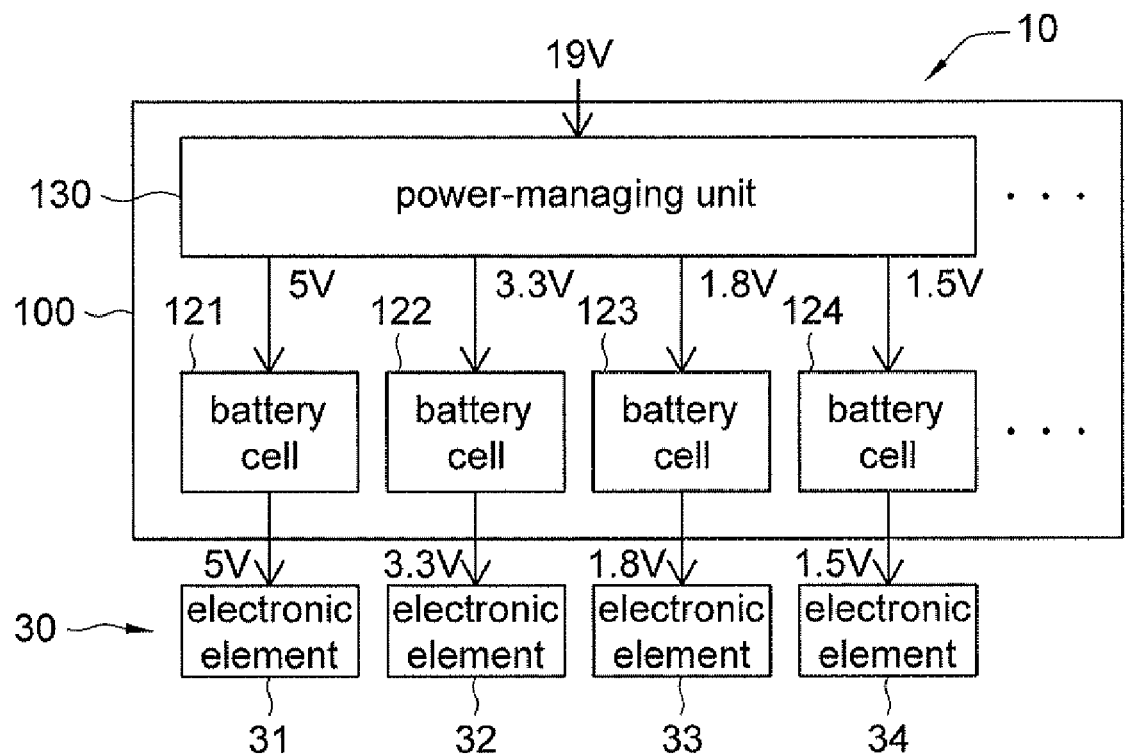
FIG. 1 shows a circuit block diagram of a multi-output voltage battery module according to a first embodiment of the invention.

Referring to FIG. 1, a circuit block diagram of a multi-output voltage battery module according to a first embodiment of the invention is shown. The multi-output voltage battery module 10 includes a main body 100, a plurality of battery cells and a power-managing unit 130. In the present embodiment of the invention, four battery cells 121~124 are taken for illustration, but the invention is not limited thereto. The battery module 10 can just have two or more than two battery cells. The battery cells 121~124 and the power-managing unit 130 are all disposed within the main body 100. The battery cells 121~124 output different supply voltages to different electronic elements 31-34 in an electronic device 30. In the present embodiment of the invention, the supply voltages of the battery cells 121~124, for example, are 5V, 3.3V, 1.8V and 1.5V respectively. The power-managing unit 130 is electrically connected to the battery cells 121~124 for converting an external voltage into a plurality of charging voltages according to the status of the battery cells 121~124 and further correspondingly outputting the charging voltages to charge the battery cells 121~124. The magnitude of the charging voltage of each battery cell is equal to that of the corresponding supply voltage. In the present embodiment of the invention, the external voltage is 19V, and the supply voltages and the charging voltages that correspond to the four battery cells 121~124 are 5V, 3.3V, 1.8V and 1.5V respectively. The supply voltage 5V is provided to electronic elements such as a keyboard controller, a basic input/output system (BIOS), a universal serial bus (USB), etc. The supply voltage 1.5V is provided to system elements such as a memory, a display card channel and so on. The voltages in the core of different CPUs are not the same and may vary from 3.5V to 1.475V. As the specifications and manufacturing process of electronic elements keep improving, the values of supply voltages used herein are merely for elaboration purpose not for limiting the scope of the invention.

When the quantities of electricity of the battery cells 121~124 are all sufficient, there is no need to charge the battery cells 121~124 at all. Meanwhile, each of the battery cells 121~124 is able to output voltages to different electronic elements 31~34 in the electronic device 30. As the power consumption of the electronic elements 31~34 varies due to their use and circuit structure, the discharging rates of the battery cells 121~124 are different. By the use of the power-managing unit 130, after the battery cells 121~124 are used for a period of time, the battery module 10 itself will detect which battery cell has low quantity of electricity and needs to be charged.

Figure 2:
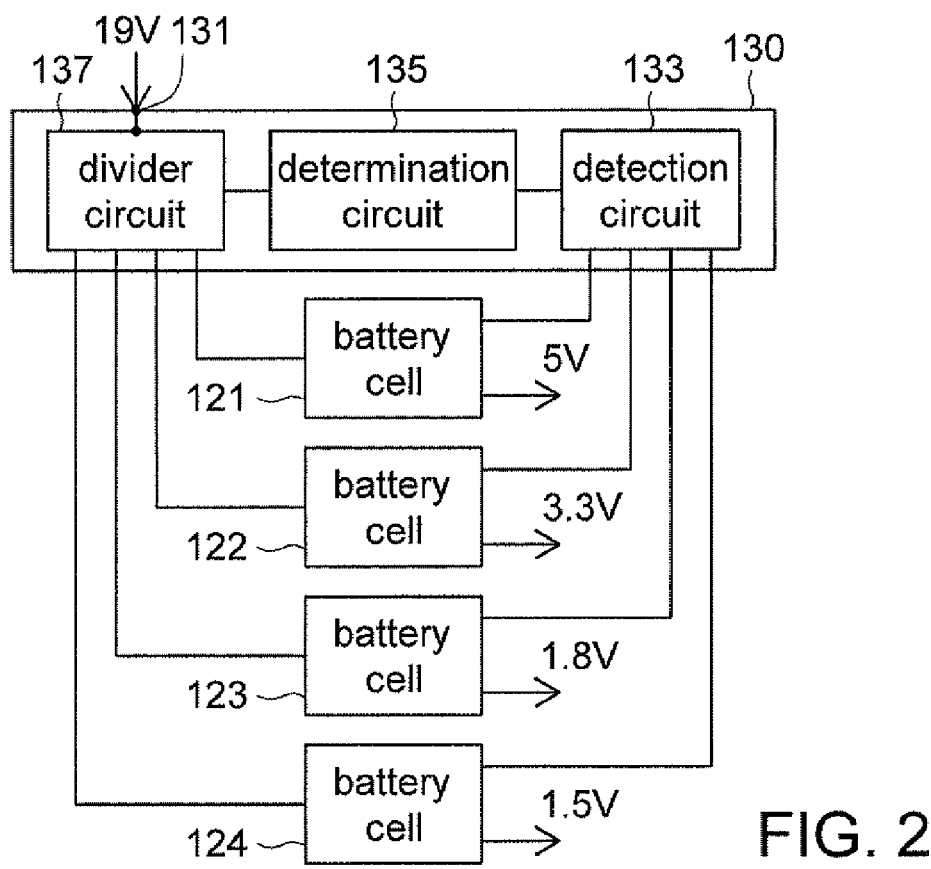
FIG. 2 shows a circuit block diagram of the power-managing unit in FIG. 1.

Referring to FIG. 2, a circuit block diagram of the power-managing unit 130 in FIG. 1 is shown. The power-managing unit 130 includes an input terminal 131, a detection circuit 133, a determination circuit 135 and a divider circuit 137. The input terminal 131 receives an external voltage. The detection circuit 133 detects the status of the battery cells 121~124. The determination circuit 135 determines whether to charge the battery cells 121~124 according to the status of the battery cells 121~124 detected by the detection circuit 133. The divider circuit 137 determines whether to convert the external voltage into a charging voltage according to the determining result of determination circuit 135 and further correspondingly outputs the charging voltage to the to-be-charged battery cell.

The detection circuit 133 may continually or periodically detect the status of the battery cells 121~124, and the result of detection is sent to the determination circuit 135 by signals. Take the battery cell 124 for example. When the determination circuit 135 accesses the result of detection from the detection circuit 133 and determines that the quantity of electricity of the battery cell 124 is below a predetermined threshold value, the determination circuit 135 drives the divider circuit 137 to convert the external voltage (19V) into the charging voltage (1.5V) of the battery cell 124 and further output the charging voltage to charge the battery cell 124. After the charging of the battery cell 124 is completed, the divider circuit 137 stops charging the battery cell 124.

In addition to the situation that the quantity of electricity is too low, a battery cell is also unable to provide electronic elements with voltage when the battery cell is out of order. Thus, a back-up battery cell can be used to temporarily work in place of the abnormal battery cell.

Figure 3:
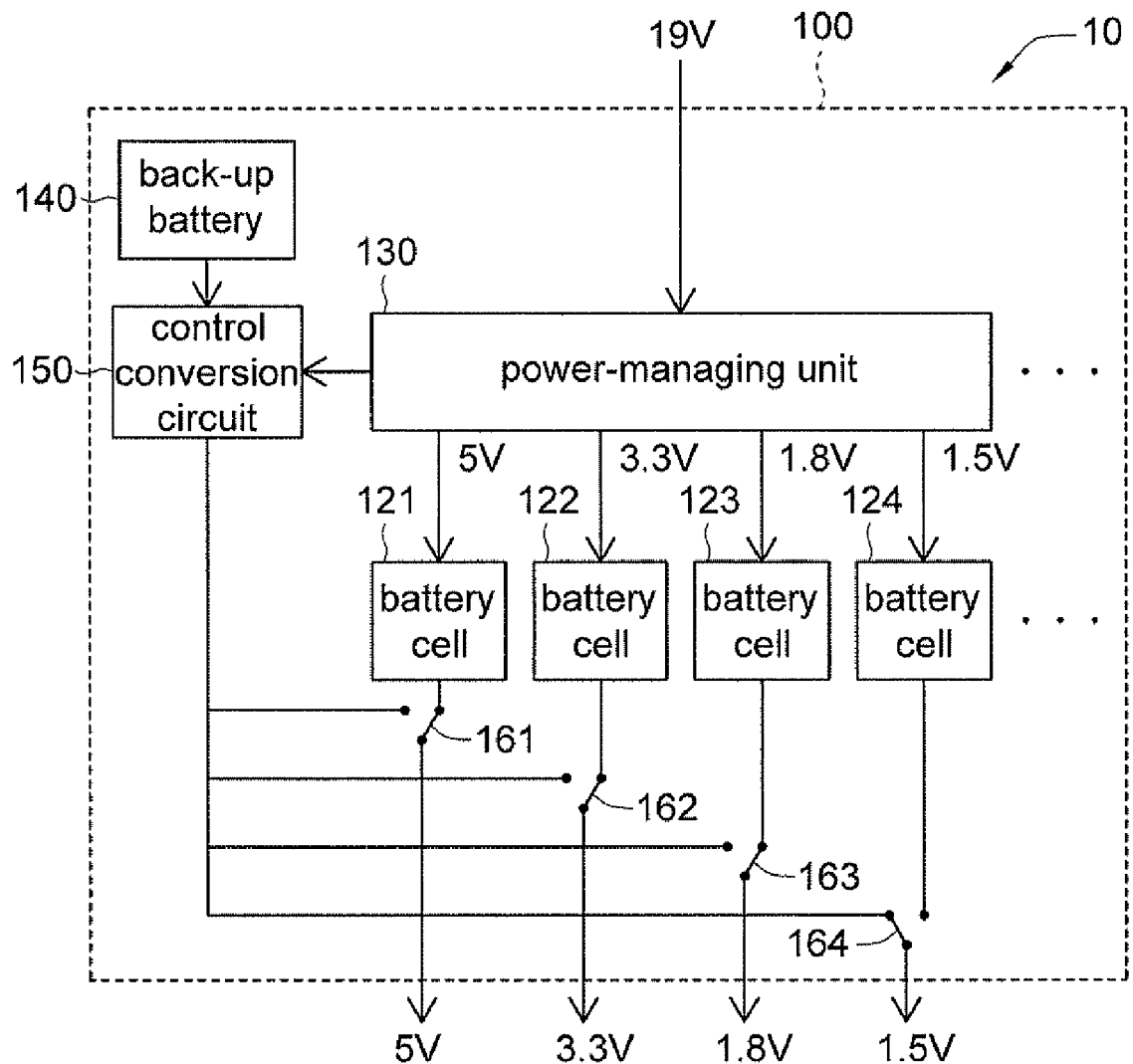
FIG. 3 is a circuit block diagram showing the battery module in FIG. 1 having a back-up battery cell.

Referring to FIG. 3, a circuit block diagram showing the battery module in FIG. 1 having a back-up battery cell is shown. The battery module 10 further includes a back-up battery cell 140, a control conversion circuit 150 and a plurality of the switch elements 161~164 in addition to the battery cells 121~124 and the power-managing unit 130 disclosed above. The back-up battery cell 140 provides a back-up voltage. The switch elements 161~164 are respectively and electrically connected to the output terminals of the battery cells 121~124 as well as the electronic elements 31~34 (shown in FIG. 1) of the electronic device 30. The control conversion circuit 150 is electrically connected to the back-up battery cell 140, the power-managing unit 130 and the switch elements 161~164. When the power-managing unit 130 detects an abnormal battery cell, the power-managing unit 130 transmits a signal to the control conversion circuit 150. Then, the control conversion circuit 150 switches the corresponding switch element and converts the back-up voltage of the back-up battery cell 140 into a supply voltage of the abnormal battery cell and outputs the supply voltage of the abnormal battery cell to the corresponding electronic element.

The control conversion circuit 150, for example, includes a smart DC/DC power converter (smart DDC) for converting the back-up voltage of the back-up battery cell 140 into the supply voltage of the battery cell 121, 122, 123 or 124.

The back-up battery cell 140 is used only when one battery cell is abnormal in providing voltage, therefore the back-up battery cell 140 does not need to have the same size like the battery cells 121~124, and the quantity of electricity of the back-up battery cell 140 is allowed to be smaller than that of battery cells 121~124. Preferably, the quantity of electricity of back-up battery cell 140 is about one tenth the quantity of electricity of the battery cells 121~124.

The battery cell 124 is taken for example. When the power-managing unit 130 detects that the quantity of electricity of battery cell 124 is too low and needs to be charged or the battery cell 124 is out of order and is unable to output voltage, the power-managing unit 130 transmits a signal to the control conversion circuit 150. Then, the control conversion circuit 150 switches the switch element 164 corresponding to the battery cell 124 so as to stop the battery cell 124 from outputting voltage, so that the back-up battery cell 140, by the use of the control conversion circuit 150 and the switch element 164, temporarily works in place of the battery cell 124 to output voltage. The control conversion circuit 150 converts the back-up voltage of the back-up battery cell 140 into the supply voltage (1.5V) of the battery cell 124.

In the present embodiment of the invention, the battery cells 121~124 and the back-up battery cell 140 all can be replaceable battery cells, so that when any of the above battery cells is out of order, the abnormal battery cell can be directly taken out from the battery module 10 and replaced by a new battery cell. Besides, the power-managing unit 130 further generates a warning signal when a battery cell is detected to be abnormal in order to remind a user of the abnormal battery.

Figure 4:
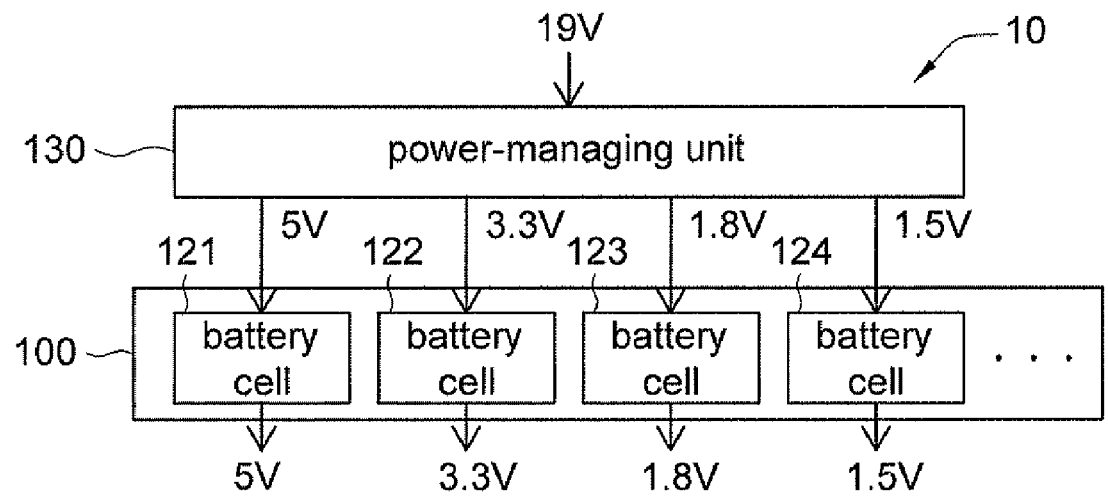
FIG. 4 is a circuit block diagram showing the power-managing unit in FIG. 1 being disposed outside the main body.
Figure 5:
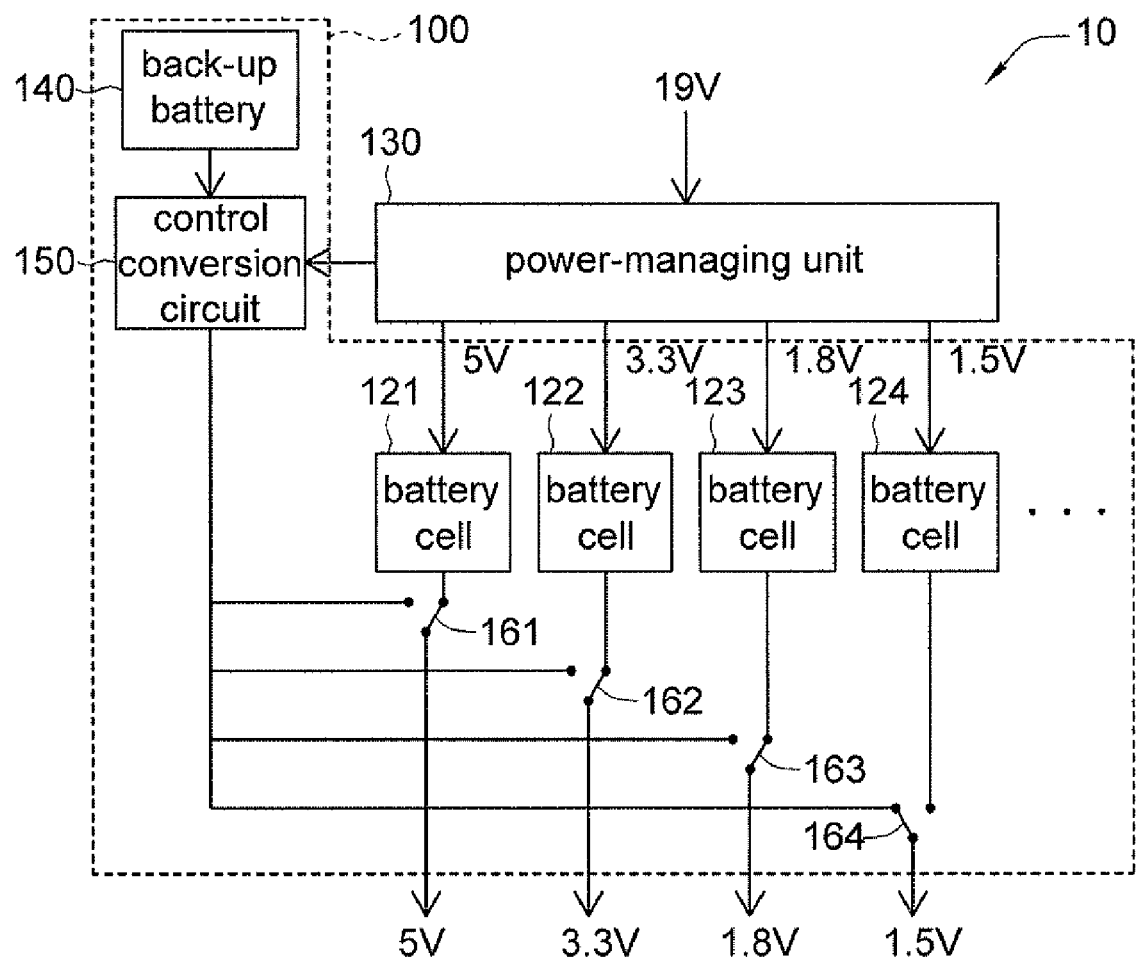
FIG. 5 is a circuit block diagram showing the power-managing unit in FIG. 3 being disposed outside the main body.

The power-managing unit 130 is disposed within the main body 100 in the above disclosure, however the invention is not limited thereto. The power-managing unit 130 can also be disposed outside the main body 100 or can be connected to the main body 100 only when needed. FIG. 4 is a circuit block diagram showing the power-managing unit 130 in FIG. 1 being disposed outside the main body 100. FIG. 5 is a circuit block diagram showing the power-managing unit 130 in FIG. 3 being disposed outside the main body 100. The power-managing unit 130 can be left unused when the battery module 10 is merely used to supply voltage. And the power-managing unit 130 is connected to the main body 100 to execute the step of charging or power supplying if the battery module 10 needs to be charged with an external voltage or needs to provide voltage to an electronic device via the external voltage. When the power-managing unit 130 is not used in charging the battery module 10, the power-managing unit 130 can also be connected to the main body 100 to detect whether the battery cells 121~124 are in normal status or have insufficient quantity of electricity. Furthermore, the power-managing unit 130 can be directly disposed in an electronic device powered by the battery module 10.

Second Embodiment

Figure 6:
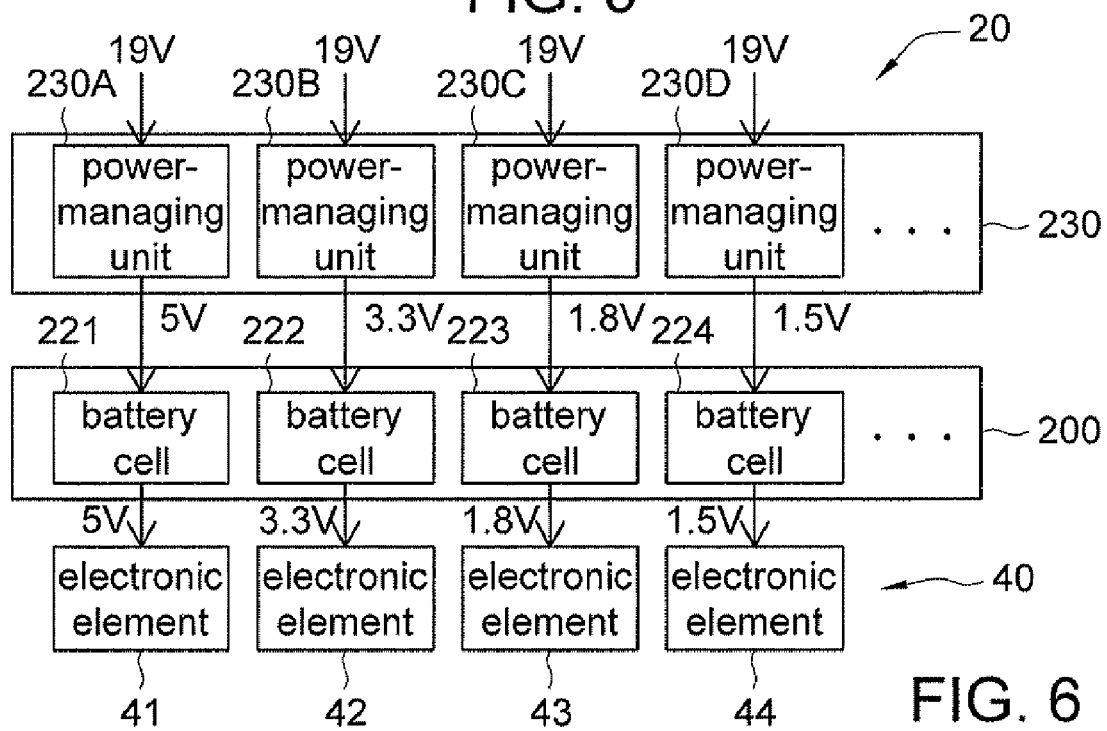
FIG. 6 shows a circuit block diagram of a multi-output voltage battery module according to a second embodiment of the invention.

Referring to FIG. 6, a circuit block diagram of a multi-output voltage battery module according to a second embodiment of the invention is shown. The battery module 20 of the present embodiment of the invention includes a main body 200, a plurality of battery cells 221~224 and a power-managing unit 230. The battery cells 221~224 are disposed within the main body 200 and output different supply voltages to different electronic elements 41~44 in an electronic device 40. In the present embodiment of the invention, the supply voltages of the battery cells 221~224 are exemplified as 5V, 3.3V, 1.8V and 1.5V respectively The power-managing unit 230 is disposed outside the main body 200 and includes a plurality of power-managing elements 230A~230D. The power-managing elements 230A~230D are electrically connected to the battery cells 221~224 respectively for converting an external voltage into different charging voltages according to the status of the battery cells 221~224 and further correspondingly outputting the charging voltages to charge the battery cells 221~224. In the present embodiment of the invention, the external voltage is exemplified as 19V, and the charging voltages corresponding to the four battery cells 221~224 are 5V, 3.3V, 1.8V and 1.5V respectively.

Figure 7:
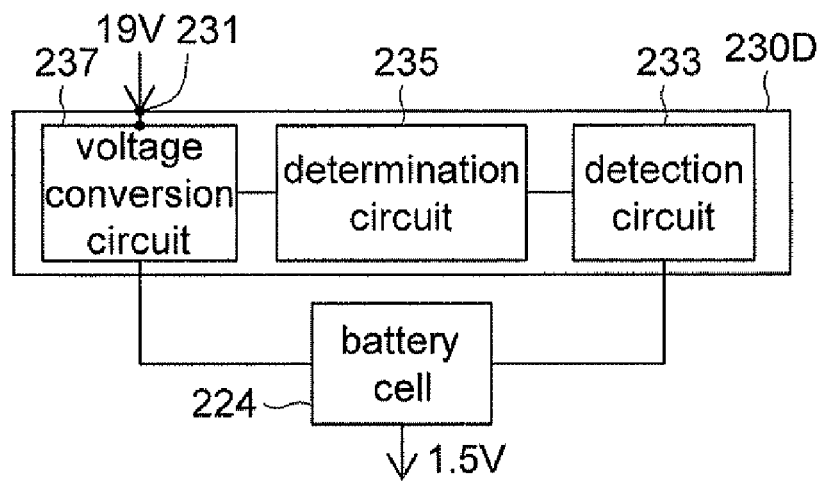
FIG. 7 is a circuit block diagram showing the power-managing element in FIG. 6 being connected to a battery cell.

The power-managing elements 230A~230D of the present embodiment of the invention have identical structure so that only the power-managing element 230D is taken for example. Referring to FIG. 7, a circuit block diagram showing the power-managing element 230D in FIG. 6 being connected to the battery cell 224 is shown. The power-managing element 230D has an input terminal 231 for receiving the external voltage. The power-managing element 230D includes a detection circuit 233, a determination circuit 235 and a voltage conversion circuit 237. The detection circuit 233 detects the state of the battery cell 224 connected thereto. The determination circuit 235 determines whether to charge the battery cell 224 according to the status of battery cell 224. The voltage conversion circuit 237 converts the external voltage (19V) into the charging voltage (1.5V) of the battery cell 224 according to the determining result from the determination circuit 235 and outputs the charging voltage to the battery cell 224.

The voltage conversion circuit 237 includes a DC/DC power converter. The detection circuit 233 may continually or periodically detect the status of the battery cell 224. When the determination circuit 235 accesses the result of detection from the detection circuit 233 and determines that the quantity of electricity of the battery cell 224 is below a predetermined threshold value, the determination circuit 235 drives the voltage conversion circuit 237 to convert the external voltage (19V) into the charging voltage (1.5V) of the battery cell 224 and further output the charging voltage to charge the battery cell 224. After the charging of the battery cell 224 is completed, the voltage conversion circuit 237 stops charging the battery cell 224.

Figure 8:
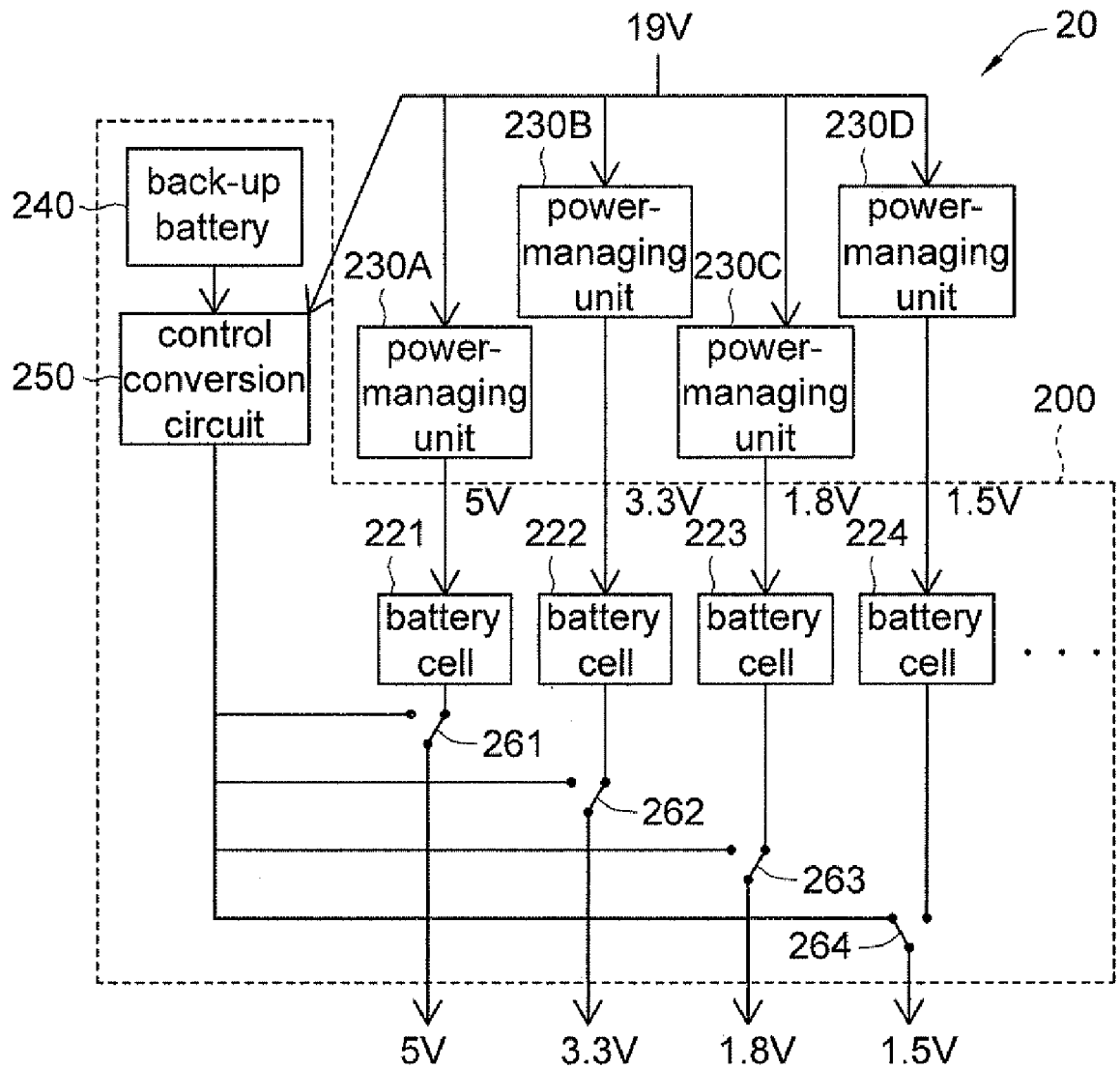
FIG. 8 is a circuit block diagram showing the battery module in FIG. 6 having a back-up battery cell.

When the quantity of electricity of a battery cell is too low or a battery cell is broken and unable to provide electronic elements with voltage, a back-up battery cell can be used to temporarily work in place of the abnormal battery cell. Referring to FIG. 8, a circuit block diagram showing the battery module in FIG. 6 having a back-up battery cell is shown. The battery module 20 further includes a back-up battery cell 240, a control conversion circuit 250 and a plurality of switch elements 261~264. The back-up battery cell 240 provides a back-up voltage. The switch element 261~264 are respectively and electrically connected to the output terminals of the battery cells 221~224 as well as the electronic elements 41~44 of the electronic device 40 (shown in FIG. 6).

The control conversion circuit 250 is electrically connected to the back-up battery cell 240, the power-managing elements 230A~230D and the switch elements 261~264. When any of the power-managing elements 230A~230D detects an abnormal battery cell, a signal is transmitted to the control conversion circuit 250. Then, the control conversion circuit 250 switches the corresponding switch element and converts the back-up voltage of the back-up battery cell 240 into a supply voltage of the abnormal battery cell, and then outputs the supply voltage of the abnormal battery cell to the corresponding electronic element.

Take the battery cell 224 for example. When the power-managing unit 230D detects that the quantity of electricity of battery cell 224 is too low and needs to be charged or the battery cell 224 is out of order and is unable to output voltage, the power-managing unit 230D transmits a signal to the control conversion circuit 250. Then, the control conversion circuit 250 switches the switch element 264 corresponding to the battery cell 224 so as to stop the battery cell 224 from outputting the voltage, so that the back-up battery cell 240, by the use of the control conversion circuit 250 and the switch element 264, temporarily works in place of the battery cell 224 to output voltage. The control conversion circuit 250 includes a DC/DC power converter for converting the back-up voltage of the back-up battery cell 240 into the supply voltage (1.5V) of the battery cell 224.

In the present embodiment of the invention, the battery cells 221~224 and the back-up battery cell 240 all can be replaceable battery cells, so that when any of the above battery cells is out of order, the abnormal battery cell can be directly taken out from the battery module 20 and replaced by a new battery cell. Besides, the power-managing unit 230 further generates a warning signal when a battery cell is detected to be abnormal in order to remind the user of the abnormal battery.

The power-managing unit 230 is disposed outside the main body 200 in the above disclosure, however the invention is not limited thereto. The power-managing unit 230 can be disposed inside the main body 200. In addition, the power-managing unit 230 can be connected to the main body 200 only when needed. The power-managing unit 230 can be left unused when the battery module 20 is merely used to supply voltage. And the power-managing unit 230 is connected to the main body 200 to execute the step of charging or power supplying if the battery module 20 needs to be charged with an external voltage or needs to provide a voltage to an electronic device via the external voltage. When the power-managing unit 230 is not used in charging the battery module 20, the power-managing unit 230 can also be connected to the main body 200 to detect whether the battery cells 221~224 are in normal status or have insufficient quantity of electricity. Furthermore, the power-managing unit 230 can be directly disposed in an electronic device powered by the battery module 20.

According to the above two embodiments, the multi-output voltage battery module has a plurality of battery cells which can be charged or discharged independently. The battery module is divided into a plurality of voltage areas by the use of the battery cells. Each voltage area of the battery module has different supply voltages, such as 5V, 3V, 1.8V and 1.5V, for providing voltages to different electronic elements in an electronic device. As the multi-output voltage battery modules in the above two embodiments have already transform the voltage inputted to the battery module, there is no need to install a DC step-down circuit in the electronic device to perform the step-down procedure of the single voltage provided to the electronic device, hence saving manufacturing cost. Also, the energy loss during the conversion of voltage in the electronic device is avoided so that the operating time of the battery module is prolonged in the electronic device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-output voltage battery module disposed in an electronic device, wherein the electronic device comprises a plurality of electronic elements, and the multi-output voltage battery module comprises:
   a main body;
   a plurality of battery cells disposed within the main body, wherein the battery cells respectively output a plurality of different supply voltages to the electronic elements; and
   a power-managing unit electrically connected to the battery cells for converting an external voltage into a plurality of charging voltages and further correspondingly outputting the charging voltages to charge the battery cells, wherein the magnitude of each charging voltage is equal to that of the corresponding supply voltage.

2. The multi-output voltage battery module according to claim 1, wherein the main body further comprises:
   a back-up battery cell for providing a back-up voltage;
   a plurality of switch elements respectively and electrically connected between the output terminals of the battery cells and the electronic elements; and
   a control conversion circuit electrically connected between the back-up battery cell and the switch elements;
   wherein when the power-managing unit detects an abnormal battery cell, the power-managing unit informs the control conversion circuit to convert the back-up voltage of the back-up battery cell into the supply voltage of the abnormal battery cell, and outputs the supply voltage of the abnormal battery cell via the switch element of the abnormal battery cell to the corresponding electronic element.

3. The multi-output voltage battery module according to claim 2, wherein the back-up battery cell is a replaceable battery cell.

4. The multi-output voltage battery module according to claim 2, wherein the quantity of electricity of the back-up battery cell is smaller than that of the battery cells.

5. The multi-output voltage battery module according to claim 1, wherein the power-managing unit comprises:
   an input terminal for receiving the external voltage;
   a detection circuit for detecting the status of the battery cells;
   a determination circuit for determining whether to charge the battery cells according to the status of the battery cells; and
   a divider circuit, wherein as the battery cells are normal, the divider circuit converts the external voltage into the charging voltages and further correspondingly outputs the charging voltages to charge the to-be-charged battery cells.

6. The multi-output voltage battery module according to claim 1, wherein the power-managing unit comprises a plurality of power-managing elements each being electrically connected to one of the battery cells, the power-managing elements each comprising:
   an input terminal for receiving the external voltage;
   a detection circuit for detecting the status of the battery cell connected thereto;
   a determination circuit for determining whether to charge the battery cell according to the status of the battery cell; and
   a voltage conversion circuit, wherein as the battery cell is normal, the voltage conversion circuit converts the external voltage into the charging voltage and further outputs the charging voltage to the battery cell.

7. The multi-output voltage battery module according to claim 6, wherein the voltage conversion circuit is a DC/DC power converter.

8. The multi-output voltage battery module according to claim 1, wherein the power-managing unit is disposed within the main body.

9. The multi-output voltage battery module according to claim 1, wherein the power-managing unit is disposed outside the main body but within the electronic device.

10. The multi-output voltage battery module according to claim 1, wherein the power-managing unit further generates a warning signal when one of the battery cells is detected to be abnormal.

11. The multi-output voltage battery module according to claim 1, wherein the power-managing unit stops charging at least one of the battery cells when the quantity of electricity of the at least one of the battery cells is detected to be sufficient.

12. The multi-output voltage battery module according to claim 1, wherein the battery cells are replaceable battery cells.

13. The multi-output voltage battery module according to claim 1, wherein the electronic device is a laptop computer.

14. An electronic device, comprising:
   a plurality of electronic elements respectively receiving a plurality of different supply voltages so as to work; and
   a multi-output voltage battery module, comprising:
      a main body;
      a plurality of battery cells disposed within the main body, wherein the battery cells respectively output the different supply voltages to the electronic elements; and
      a power-managing unit electrically connected to the battery cells for converting an external voltage into a plurality of charging voltages and further correspondingly outputting the charging voltages to charge the battery cells, wherein the magnitude of each charging voltage is equal to that of the corresponding supply voltage.

15. The electronic device according to claim 14, wherein the main body further comprises:
   a back-up battery cell for providing a back-up voltage;
   a plurality of the switch element respectively and electrically connected between the output terminals of the battery cells and the electronic elements; and
   a control conversion circuit electrically connected between the back-up battery cell and the switch elements;
   wherein when the power-managing unit detects an abnormal battery cell, the power-managing unit informs the control conversion circuit to convert the back-up voltage of the back-up battery cell into the supply voltage of the abnormal battery cell, and outputs the supply voltage of the abnormal battery cell via the switch element of the abnormal battery cell to the corresponding electronic element.

16. The electronic device according to claim 15, wherein the back-up battery cell is a replaceable battery cell.

17. The electronic device according to claim 15, wherein the quantity of electricity of the back-up battery cell is smaller than that of the battery cells.

18. The electronic device according to claim 14, wherein the power-managing unit comprises:
   an input terminal for receiving the external voltage;
   a detection circuit for detecting the status of the battery cells;
   a determination circuit for determining whether to charge the battery cells according to the status of the battery cells; and
   a divider circuit, wherein as the battery cells are normal, the divider circuit converts the external voltage into the charging voltages and further correspondingly outputs the charging voltages to charge the to-be-charged battery cells.

19. The electronic device according to claim 14, wherein the power-managing unit comprises a plurality of power-managing element each being electrically connected to one of the battery cells, the power-managing elements each comprising:
   an input terminal for receiving the external voltage;
   a detection circuit for detecting to the status of the battery cell connected thereto;
   a determination circuit for determining whether to charge the battery cell according to the status of the battery cell; and
   a voltage conversion circuit, wherein as the battery cell is normal, the voltage conversion circuit converts the external voltage into the charging voltage and further outputs the charging voltage to the battery cell.

20. The electronic device according to claim 19, wherein the voltage conversion circuit is a DC/DC power converter.

21. The electronic device according to claim 14, wherein the power-managing unit is disposed within the main body.

22. The electronic device according to claim 14, wherein the power-managing unit is disposed outside the main body but within the electronic device.

23. The electronic device according to claim 14, wherein the power-managing unit further generates a warning signal when one of the battery cells is detected to be abnormal.

24. The electronic device according to claim 14, wherein the power-managing unit stops charging at least one of the battery cells when the quantity of electricity of the at least one of the battery cells is detected to be sufficient.

25. The electronic device according to claim 14, wherein the battery cells are replaceable battery cells.

26. The electronic device according to claim 14, wherein the electronic device is a laptop computer.

* * * * *